April 9, 1935. H. SCHMITT 1,997,154
DAMPING DEVICE FOR OVERHEAD CABLES
Filed Nov. 9, 1931
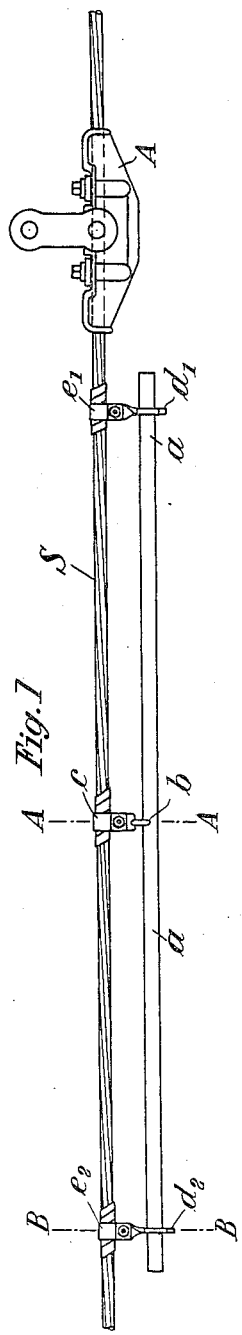
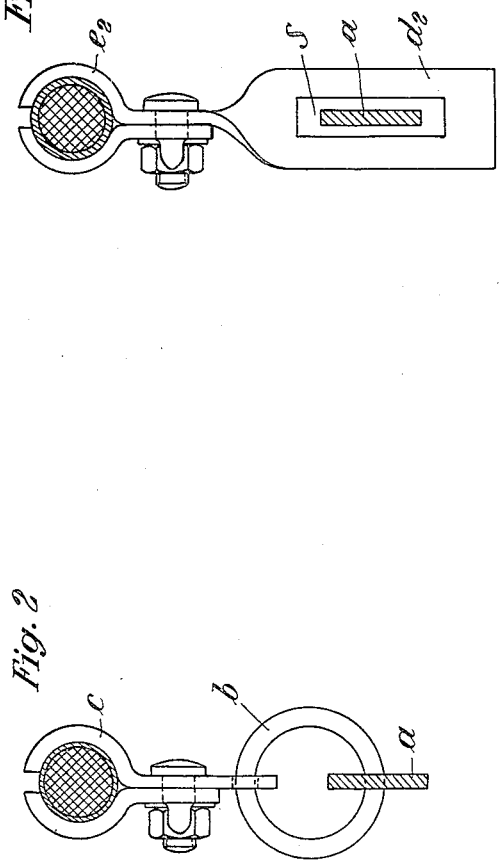
Inventor:
H. Schmitt
By: Mark & Clerk
Attys.

Patented Apr. 9, 1935

1,997,154

UNITED STATES PATENT OFFICE 1,997,154

DAMPING DEVICE FOR OVERHEAD CABLES

Hans Schmitt, Lautawerk/Lausitz, Germany

Application November 9, 1931, Serial No. 574,052
In Germany May 2, 1931

1 Claim. (Cl. 173—13)

The durability of metallic transmission line conductor wires, tubes or cables, especially those which are twisted from wires, is greatly endangered through the continuous vibrations which are caused through the wind and which have a very destructive effect on the cable at the points of suspension and frequently lead to ruptures of the same.

Many attempts have been made to overcome the serious troubles due to these vibrations or oscillations and various damping and cushioning devices have been proposed to eliminate the same, these devices being either fastened only to the cable or to its suspension means or to both of them.

They serve for taking up the vibrations in such manner that at the rebound, swinging at the securing point of the cable is prevented.

Such known damping elements include pneumatic dashpots, damping balances, damping levers, springs, additional cables, mechanical friction appliances, etc.

However none of the known devices has really solved this problem satisfactorily and has obtained a complete elimination of these obnoxious oscillations.

It must also be borne in mind, that the rapid wear, the necessary attendance, the complicated construction, the difficulties in mounting the same and other factors make then uneconomical and expensive.

The prime object of the present invention which is based on extensive trial work and experience, is to avoid all these drawbacks. It is proved by this invention, that the oscillations are completely damped by means of a balance-beam suspended directly from the cable, the ends of which are movably connected with the cable in such a manner that the movement imparted to one end of the beam by an oscillation causes a counter-movement at the other end of the beam, which damps or takes up this oscillation of the cable. In this way the effect is obtained, that the oscillation energy is converted into impulse energy and at the same time this impulse energy is again converted into pressure energy, which opposes a counter-oscillation to the incoming or outgoing oscillation, the impact work itself causing a large part of the damping.

In the accompanying drawing, which illustrates the invention by way of example

Fig. 1 is a side view of the new device.

Fig. 2 is a vertical section according to line A—A of Fig. 1,

Fig. 3 is a vertical section according to line B—B of Fig. 1 on an enlarged scale.

Sideways of the cable carrying clamp A, which is supported in a known manner, a balance beam $a$ is provided; this beam is pivotally connected by means of a ring or a link $b$ to the clamping member $c$. This member $c$ is clamped around the cable S and tightened to the same.

The ends of the beam $a$ are freely movable in guiding slots $s$ of the shanks $d^1$ and $d^2$ serving as stops; these shanks are clamped to the cable by means of loops $e^1$ and $e^2$.

If an oscillation of the cable occurs at the end $e^2$ and $d^2$ of the balance-beam farther from the cable clamp, the guide $d^2$ transmits the oscillation through the balance-beam to the guide $d^1$ which is near the cable clamp; the oscillation energy is here transformed into impact work and this produces a counter action in the cable which causes the incoming oscillations to be eliminated.

This pressure action is proportional to the amplitude and the frequency of the vibrations of the cable.

The present damping device is very simple to manufacture, cheap, resistant to the attacks of the atmosphere and very effective.

What I claim is:

A device for damping the oscillations produced in overhead cables by air currents comprising a rigid balance beam, means pivotally and directly connecting the beam intermediate its ends to the cable and underneath the latter, circumferentially closed guiding elements fastened to the cable at both sides of the connecting means and having slots receiving the ends of the balance beam.

HANS SCHMITT.